United States Patent [19]

Kawaguchi

[11] 4,302,056
[45] Nov. 24, 1981

[54] DUAL TYPE HYDRAULIC BRAKING SYSTEM FOR A VEHICLE

[75] Inventor: Hiroshi Kawaguchi, Mishima, Japan

[73] Assignee: Toyota Jidosha Kogyo Kabushiki Kaisha, Toyota, Japan

[21] Appl. No.: 114,650

[22] Filed: Jan. 23, 1980

Related U.S. Application Data

[63] Continuation of Ser. No. 883,855, Mar. 6, 1978, abandoned.

[30] Foreign Application Priority Data

Nov. 19, 1977 [JP] Japan .................. 52-139129

[51] Int. Cl.³ ............................................. B60T 13/00
[52] U.S. Cl. .................................... 303/6 C; 188/349
[58] Field of Search ................. 303/6 C, 84 R, 84 A; 188/349, 345, 151 A

[56] References Cited

U.S. PATENT DOCUMENTS

| | | | |
|---|---|---|---|
| 3,467,440 | 9/1969 | Strien | 303/6 C |
| 3,627,385 | 12/1971 | Stokes | 303/6 C |
| 3,650,569 | 3/1972 | Kawabe et al. | 303/6 C |
| 3,804,468 | 4/1974 | Ishikawa et al. | 303/6 C |
| 3,969,000 | 7/1976 | Ohta et al. | 303/6 C |
| 4,070,067 | 1/1978 | Katoh et al. | 303/6 C |

FOREIGN PATENT DOCUMENTS

| | | | |
|---|---|---|---|
| 1430330 | 11/1968 | Fed. Rep. of Germany | 303/6 C |
| 1455826 | 11/1976 | United Kingdom | 303/6 C |

*Primary Examiner*—Douglas C. Butler
*Attorney, Agent, or Firm*—Browdy and Neimark

[57] ABSTRACT

A hydraulic braking system for a vehicle having independent dual braking circuits delivers the hydraulic pressure produced in a master cylinder to each wheel cylinder mounted on the front and rear wheels. A pressure control valve is provided with a portion similarly constructed to the ordinary proportioning valve. A first piston disposed in this portion for the hydraulic pressure control operation confronts a second piston, which is with a spring constantly biased theretoward and provided with a small-diametered portion and a large-diametered portion. The second piston is placed such that the small-diametered portion thereof confronts the first piston in one air chamber and the large-diametered portion thereof is extended into another air chamber, an end surface of which large-diametered portion on the side of the small-diametered portion being affected by the hydraulic pressure from the other or opposite circuit from one circuit wherein the pressure control valve controls the hydraulic pressure.

10 Claims, 8 Drawing Figures

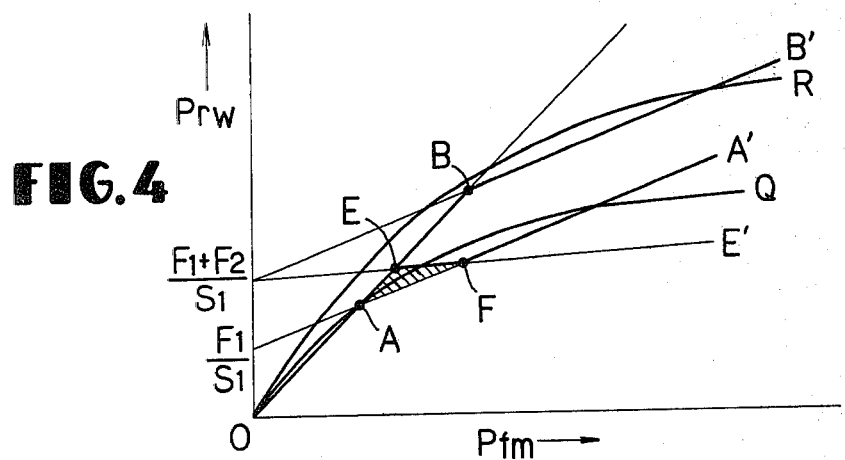
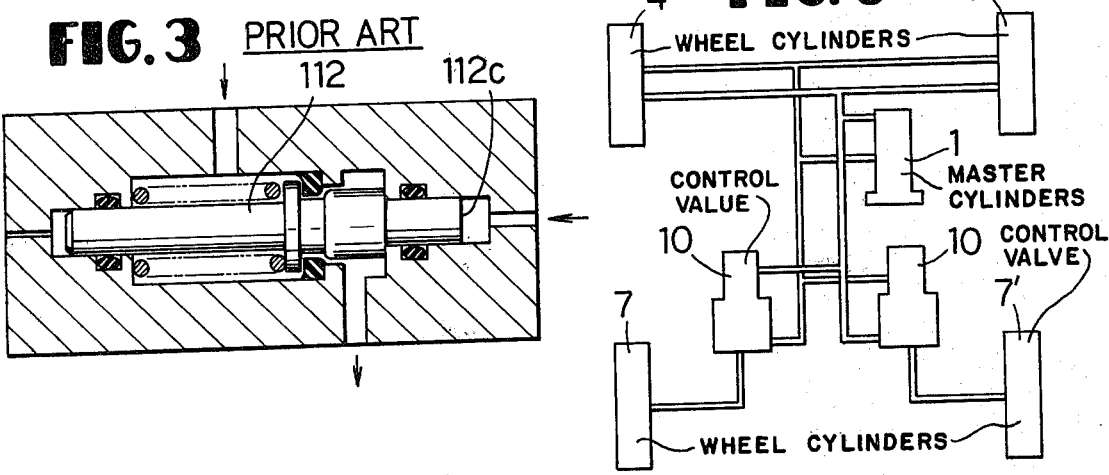
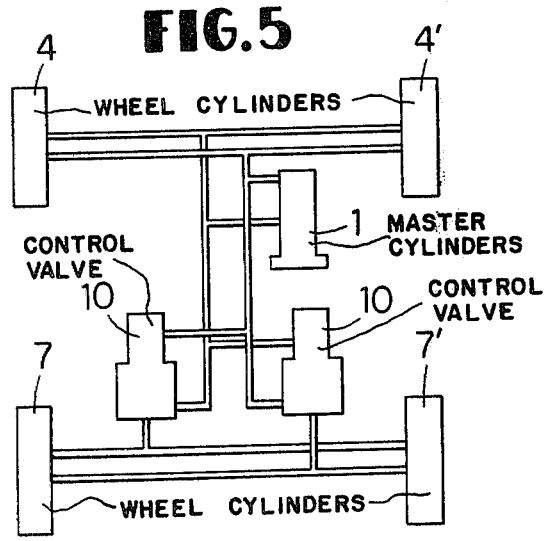
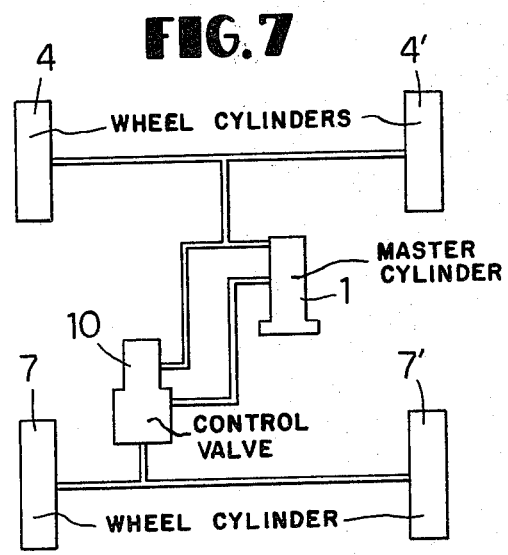

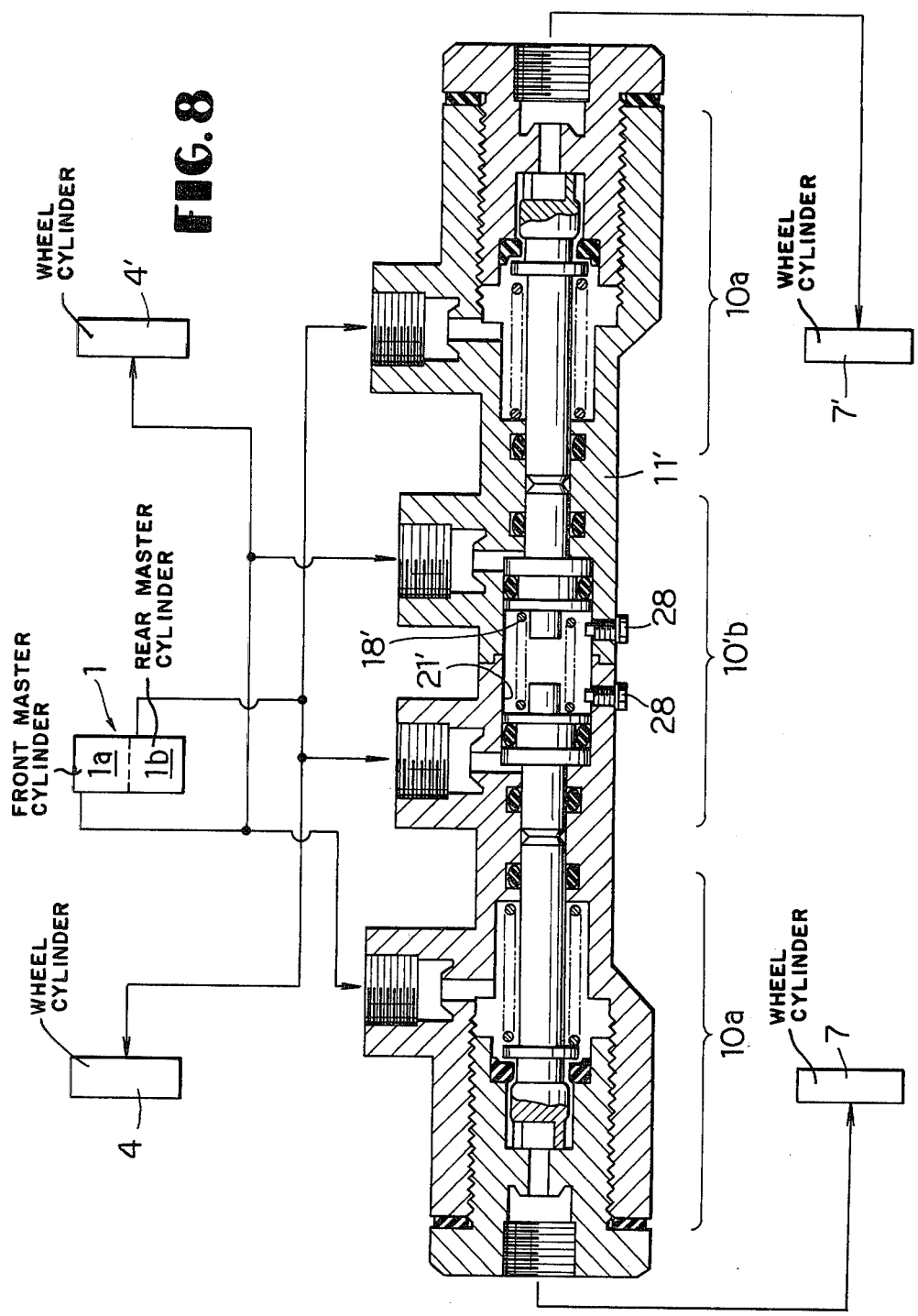

DUAL TYPE HYDRAULIC BRAKING SYSTEM FOR A VEHICLE

This is a continuation of application Ser. No. 883,855 filed Mar. 6, 1978, now abandoned.

BACKGROUND OF THE INVENTION

This invention relates to a hydraulic braking system, including a pair of mutually independent hydraulic circuits, for a vehicle. It relates, more particularly, to a hydraulic brake system provided with a controlling means which is capable of suitably adjusting the braking pressure of the wheel cylinders mounted on the rear wheels of a vehicle.

In many vehicle hydraulic brake systems the circuit connecting the master cylinder, wherein the braking hydraulic pressure is created, to the wheel cylinders, mounted on each front and rear wheel, is usually divided into two mutually independent circuits for the purpose of safety enhancement. Many of them are also provided with a pressure control valve or valves (hereinafter sometimes called simply control valve) within the circuit for the purpose of making an adjustment such that when the pressure in the master cylinder rises exceeding by chance a certain preset value the wheel cylinder pressure of the rear wheel (hereinafter called rear wheel cylinder pressure) is controlled so as to be smaller, in the rising rate, than the master cylinder pressure. The above adjustment is aimed at elimination of the lock phenomenon (wheels stop rotation inviting a slippage between the ground surface and the wheels themselves), which usually occurs in the rear wheels alone when the brake is applied, as well as attainment of the sufficient braking effect.

The abovementioned control valve is so set as to suitably determine, when the two braking hydraulic circuits are in good operating condition, the ratio of braking power between the front and rear wheels. When, however, a damage or trouble should occur in any one circuit, this control valve is liable to restrict the braking power at the rear wheel or wheels less than is necessary.

In the event of a trouble occurring in one circuit, the load decreasing, when the brake is applied, on the rear wheels is less than when both circuits are in normal condition, because the load shifting forward becomes less in such an occasion. So the braking power on the rear wheels can be increased, larger in comparison with the normal time, before the lock phenomenon begins to take place. When any one side circuit is damaged, decelerating rate of the vehicle is decreased in comparison with that in the normal condition wherein both circuits are in good order. In other words the control valve restricts the sufficient increase of the braking power on the rear wheels, when such a trouble occurs in one circuit out of the two. In such a situation reduction of load on the rear wheels owing to a forward shifting of load becomes less in comparison with the normal condition, because of decreasing of the deceleration rate. Braking pressure on the rear wheels should be larger than in the normal condition, so long as the locking is considered. Nevertheless, the control valve restricts the rear wheel cylinder pressure likewise in the normal condition, wherein both circuits are in good order. It means that the control valve makes it impossible to sufficiently raise the braking power as desired on the rear wheel or wheels.

There have conventionally been proposed, in case of a trouble happening in one circuit, various methods or steps for sufficiently raising the rear wheel braking power, such as by blocking or restricting the operation of the control valve, or by means of by-passing the hydraulic power independently of the control valve. There is one example, wherein on a part of a piston for controlling the hydraulic power within the control valve, a hydraulic power from a separate circuit is applied in the direction of closing the control valve, for enabling the control valve to function, in this status, as the ordinary control valve. (The circuit, the hydraulic pressure thereof being under the control of this control valve, is hereinafter called the controlled circuit. A separate circuit hereinafter called the circuit independent of the above circuit is provided, the hydraulic pressure thereof being led into the above mentioned control valve.) By means of such an arrangement it becomes possible, when the other circuit is damaged to be unable to sufficiently raise the pressure, to make the hydraulic pressure for actuating the piston insufficient or scanty. The control valve will consequently not start the controlling operation unless the controlled circuit is supplied with enough pressure for compensating the lessened pressure, which means a larger braking power than that in the normal condition (both circuits are in good order) on the rear wheel or wheels can be attained. This hydraulic control system is a very excellent device with a simplified construction, being capable of functioning suitably in two different ways, i.e., when both circuits are in normal condition and when any one circuit happens to be malfunctioning. Nevertheless, it still can not be said to be perfect; it can not match the preferred embodiment of this invention in case of one circuit being damaged, as described later in detail.

SUMMARY OF THE INVENTION

This invention is principally aimed at the elimination of the conventional disadvantages of the prior art.

It is therefore a primary object of this invention to provide an excellent dual type vehicle braking system which is capable of attaining the ideal rear-wheel braking power even in case of a trouble occurring in one braking circuit not only while both circuits are in good order.

It is another object of this invention to provide a dual type braking system of simple structure, which still maintains the abovementioned excellent performance.

It is still another important object of this invention to provide a dual type braking system which is capable of controlling the pressure of the rear wheel cylinder in better condition than that in the conventional control valves, even when both circuits are in good order.

BRIEF DESCRIPTION OF THE DRAWINGS

FIG. 3 is a schematical sectional view in elevation of a conventional pressure control valve (prior art);

FIG. 4 is a graph showing another operational condition of the device shown in FIG. 1;

FIGS. 5, 6, and 7 are respectively a schematical diagram in plan of different embodiments; and FIG. 8 is diagrammatical circuit of a braking system containing a sectional view in elevation of an essential part of still another embodiment.

DETAILED DESCRIPTION OF PREFERRED EMBODIMENTS

CONSTRUCTION

Figure 1:
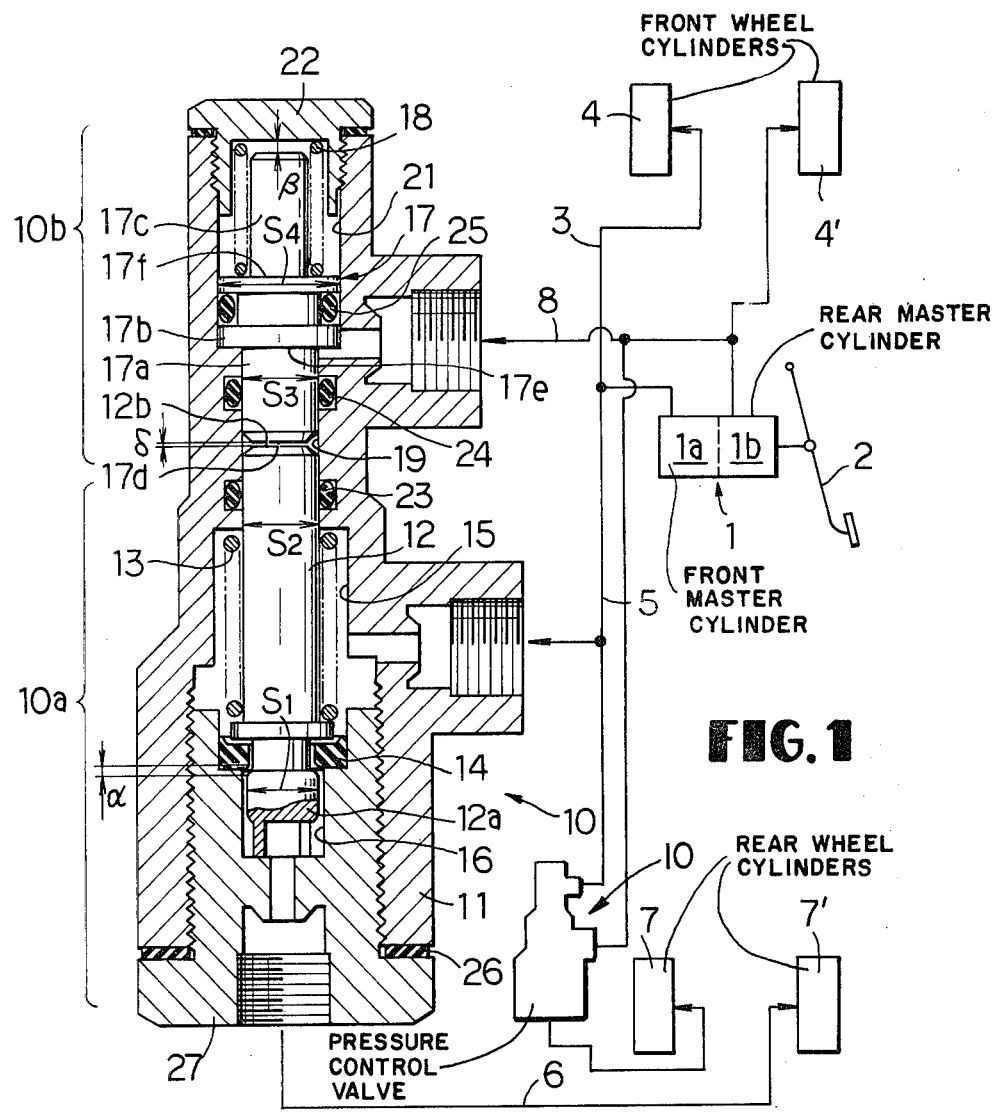
FIG. 1 is a diagrammatical circuit of a braking system containing a sectional view in elevation of an essential part of a preferred embodiment.

A tandem arranged master cylinder 1 in FIG. 1, a compressing chamber consisting of two parts, i.e., a front master cylinder 1a and a rear master cylinder 1b, is so constructed as to create, by depressing of a brake pedal 2, hydraulic pressure in two ways, which are respectively lead to two independent braking circuits. The pressure from the front master cylinder 1a is lead, through a conduit 3 to a left front wheel cylinder 4 disposed on the left front wheel on one hand, and on the other hand through a conduit 5, a first pressure control valve 10, and a conduit 6 to a right rear wheel cylinder 7' disposed on the right rear wheel. This circuit will be called herewith the first braking circuit or the first circuit. The pressure from the rear master cylinder 1b is led, through another braking circuit which is in a completely symmetrical relation with the abovementioned first circuit, being named herewith the second braking circuit or the second circuit, directly to a right front wheel cylinder 4' disposed on the right front wheel and a left rear wheel cylinder 7 on the left rear wheel via a second pressure control valve 10, not shown in detail. These two circuits may be said a diagonal type dual braking circuit. The pressure control valve 10 includes two parts, a proportioning valve portion 10a and a controlling portion 10b therefor, accommodated in a housing 11. The former 10a is a conventional proportioning valve containing a first piston 12, a spring 13, a valve seat 14, etc., wherein the first piston 12 is axially reciprocable due to the balance relation between the pressure in a first and second oil chambers 15, 16 and the elasticity of the spring 13; and a valve body formed on a part of the first piston 12 and a valve seat 14 serve to communicate or interrupt the oil flow between the conduit 5 and the conduit 6. On the other hand the controlling portion 10b includes a second piston 17 and a spring 18, the piston 17 being a stepped piston which consists of a small-diametered portion 17a, a large-diametered portion 17b, and a stopper portion 17c. The second piston 17 is arranged such that the end surface 17d of the small-diametered portion thereof confronts the end surface 12b of the first piston 12 in an air chamber 19 formed in the housing 11. The large-diametered portion 17b of the second piston 17 is, on the under side end surface 17e thereof, in FIG. 1, affected by the hydraulic pressure from the rear master cylinder 1b through a conduit 8, and is on the opposite side end surface 17f thereof faced with another air chamber 21. The second piston 17 is so constructed as to be constantly biased by the elasticity of the spring 18 toward the first piston 12, and to be, in this condition, abutted on the end surface of the first piston 12 or confronted thereto with a small gap δ between the two, which gap is smaller than the shifting distance α of the first piston 12 for the pressure control. The second piston 17 will be, when the pressure of the rear master cylinder 1b exceeds a certain preset value, drawn or shifted backwards, upwards in FIG. 1, overcoming the elasticity of the spring 18, the distance of this shifting β being limited by the abutment of the stopper portion 17c to the inner surface of a plug 22 threaded into the end portion, upper end portion in FIG. 1, of the housing 11. The shifting distance β is set such that it is a little larger than α−δ, that is, the result of subtracting the gap δ from the shifting distance α of the first piston 12 for the pressure control: $\beta > \alpha - \delta$. So when the second piston 17 is in its drawn back position, the first piston 12 is allowed to freely execute the pressure control, and the controlling oil amount required for actuating the second piston 17 may be minimized. Numerals 23, 24, and 25 are respectively sealing rings, and 26 designates a packing. Another plug 27 is threaded into the housing 11 for forming a first oil chamber 15 and a second oil chamber 16 and for functioning as a stopper for the first piston 12. The plug 27 is provided with a port therein for being connected to the conduit 6.

FUNCTION

The pressure control valve 10 can be operated in two different modes, according to the load amount set on the spring 18. Some signs for representing the area, the set load, and the pressure amount relevant will be alotted as follows for explaining the function of the pressure control, dividing into respective cases.

$S_1$: cross-sectional area of the valve body
$S_2$: cross-sectional area of the first piston 12
$S_3$: cross-sectional area of the small-diametered portion 17a of the second piston 17
$S_4$: cross-sectional area of the large-diametered portion 17b of the second piston 17
$F_1$: set load amount of the spring 13
$F_2$: set load amount of the spring 18
Pfm: pressure of the front master cylinder 1a
Prm: pressure of the rear master cylinder 1b
Pfw: pressure of the front wheel cylinder
Prw: pressure of the rear wheel cylinder
Po: starting pressure at the pressure control operation imparted by the proportioning valve portion 10a alone Assuming a case wherein the second piston 17 is drawn back before the proportioning valve portion 10a begins to operate a pressure controlling, detailed description will be made now. That means the case:

$$Po \cdot (S_4 - S_3) > F_2$$

If both the first and second braking circuits are in good order, a depressing of the brake pedal 2 simultaneously raises the front and rear master cylinder pressure Pfm, Prm at a same rising rate. While Pfm and Prm are lower than Po, the first piston 12 maintains its original position shown in FIG. 1 and the valve body 12a is consequently away from the valve seat 14 for allowing the conduit 5 and the conduit 6 mutual communication. The pressure Prw in the rear wheel cylinder will rise at the same rate with that in the front master cylinder Pfm, which means it varies along the straight line OA in FIG. 2. As the set load $F_2$ of the spring 18 is predetermined as to satisfy the formula $F_2 < Po(S_4 - S_3)$, the second piston 17 will, on the other hand, finish shifting while the pressure Pfm in the front master cylinder is less than Po. As a result of this, even when the first piston 12 begins the well known pressure controlling operation, due to surpassing of the pressure Po by the front master cylinder pressure Pfm, it does not abut the second piston 17. The proportioning valve portion 10a will function just like an ordinary proportioning valve, which does not include a controlling portion 10b. The force balancing condition, in this instance, of the first piston 12 can be represented as:

$$Pfm \cdot (S_1 - S_2) + F_1 - Prw \cdot S_1 = 0$$

Figure 2:
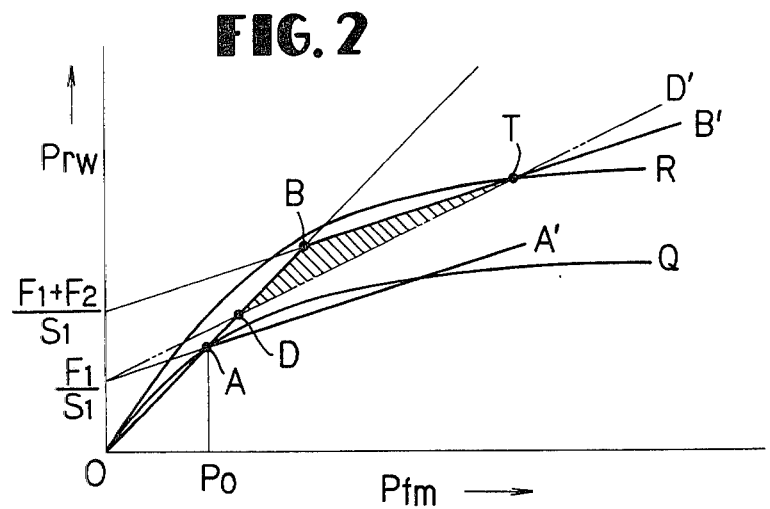
FIG. 2 is a graph showing one operational condition of the device shown in FIG. 1.

The pressure Prw of the rear wheel cylinder will therefore vary along the line AA' in FIG. 2, which can be represented as the formula:

$$Prw = \frac{(S_1 - S_2)}{S_1} \cdot Pfm + \frac{F_1}{S_1}$$

This line AA' can be said fairly near in its inclination the curve Q in FIG. 2, i.e., the well known ideal curve.

Secondly a consideration will be made in a case wherein the second braking circuit has a trouble or a damage within itself and does not entirely deliver the hydraulic pressure to the second piston 17. In this case, the second piston 17 will remain in a position shown in FIG. 1, even at a moment when the pressure Pfm of the front master cylinder exceeds Po to actuate the first piston 12, which requires the first piston 12, for operating the pressure controlling, to surpass not only the elasticity of the spring 13 but also that of the spring 18, for shifting the second piston 17 together with the shifting of itself. The force balancing condition at this time can be represented by the formula:

$$Pfm \cdot (S_1 - S_2) + F_1 + F_2 - Prw \cdot S_1 = 0$$

Consequently the pressure Prw in the rear wheel cylinder is to vary along the straight line BB' in FIG. 2, which can be represented by the formula:

$$Prw = \frac{(S_1 - S_2)}{S_1} \cdot Pfm + \frac{F_1 + F_2}{S_1}$$

When the second braking circuit has a trouble or damage, in this diagonal type dual braking circuit, the braking power of the whole braking system is reduced for lowering the decelerating rate of the vehicle, which results in less decreasing of the rear wheel load, when brake is applied, in comparison with the normal condition where both braking circuits are free of trouble. The pressure Prw in the rear wheel cylinder is in such a situation desired to rise fairly steeply as to be along the curve R, in FIG. 2, away from the curve Q, or the ideal curve appearing when both braking circuits are normal.

However, in a conventional pressure control valve, shown in FIG. 3, a piston 112 receives a pressure on a part of itself, i.e., on the end surface 112c of its extended portion, from the second circuit independent from the first circuit in which the hydraulic pressure is controlled by the very pressure control valve. When a trouble occurs in the second circuit, in the above instance, the pressure control will describe the two-dot chain line DD' in FIG. 2. The characteristic line OBB' described by the pressure control valve 10 of this invention, shown in FIG. 2, is far near the ideal line R than the characteristic line ODD' described by the conventional pressure control valve illustrated in FIG. 3. Assume the point, where both lines, OBB' and ODD', cross the ideal curve R, is T the invented device can be larger in the braking effect on the rear wheels, by the amount shown with the hatched triangle area, than the conventional one shown in FIG. 3.

As a second operating mode of the device, shown in FIG. 1, that is, a case wherein the second piston 17 of the controlling portion 10b is drawn back away from the first piston 12 after the proportioning valve portion 10a has begun the pressure control operation, will be described now, which is:

$$Po \cdot (S_4 - S_3) < F_2$$

In this case, the balancing condition at the beginning of the pressure control operation of the first piston 12 is represented:

$$F_1 + Pfm \cdot (S_1 - S_2) - Prw \cdot S_1 + F_2 - Prm \cdot (S_4 - S_3) = 0$$

The pressure Prw of the rear wheel cylinder is therefore represented by the formula:

$$Prw = \frac{(S_1 - S_2)}{S_1} \cdot Pfm - \frac{(S_4 - S_3)}{S_1} \cdot Prm + \frac{F_1 + F_2}{S_1}$$

It means the pressure Prw varies along the line EE' in FIG. 4. After it has reached the point F, that is a pressure $P_1$, the second piston 17 begins to be drawn back away from the first piston 12, so the proportioning valve portion 10a can independently operate to make the rear wheel cylinder pressure Prw vary along the line AA'.

With comparison to the operation mode shown in FIG. 2, wherein the proportioning valve portion 10a is allowed to independently operate from the beginning, the braking effect on the rear wheels in this instance can be larger, by the amount represented with the hatched triangular portion in FIG. 4, which means a remarkable improvement of the braking performance, in the sphere of ordinary pressure, or left side from the F point. As this sphere of ordinary pressure occupies more than 80% of the whole braking operation, this improvement of the braking effect is of very high practical value. Such a way of enhancing the braking effect on the rear wheels may lead for some time to a likelihood of locking phenomenon; further rise of the braking pressure will, however, hold down the rear wheel cylinder pressure Prw quite gentle to rise along the straight line EE' thereby coming below the ideal line Q again. An actual locking of the rear wheels can thus naturally be avoided. In addition, after the locking of the rear wheels has been avoided the rear wheel cylinder pressure Prw begins to rise along the steep straight line AA', which results in not reducing the braking effect on the rear wheels even in the sphere of high braking pressure.

The extremely high operation effect of the control valve 10 of this invention, in a case wherein both circuits are in good order, has been described above in greater detail. In the event of a trouble happening in the second circuit, the rear wheel cylinder pressure Prw varies, taking an almost identical operation mode to that shown in FIG. 2, along the characteristic line OBB' which closely resembles the ideal line R. The hydraulic braking system provided with a control valve 10 which can show the operation mode illustrated in FIG. 4 is capable of improving the braking effect in either case both circuits being normal or one circuit being in a trouble.

The above described embodiments are all for exemplifying this invention, and not for limiting the scope of the invention. Many variations or modifications are possible without departing from the spirit of this invention.

Several of those modifications will be outlined by way of example: (1) Instead of the diagonal braking system a so-called complete dual braking system shown in FIG. 5, wherein all of both circuits are respectively connected to each of the four wheels independently for delivering the hydraulic pressure; (2) A system, shown in FIG. 6, wherein each of the two circuits can deliver the hydraulic pressure to both front wheels and one rear wheel; and (3) Another system, in FIG. 7, which is designed such that one circuit can deliver the hydraulic pressure to the two front wheels and the other circuit is likewise connected to the two rear wheels for hydraulic pressure delivery. In all of these examples almost same effect as in the diagonal braking system can be attained.

Another modification shown in FIG. 8 in which two of the pressure control valve 10 are employed, with both being connected to the controlling portion 10b for sharing the air chamber 21' and the spring 18', is also practicable. In this embodiment the housing 11' is clamped together at flange portions protruding on the controlling portion side thereof in the perpendicular direction to the drawing paper surface in FIG. 8 with bolts (not shown). The shifting distance of the second pistons 17 is restricted respectively by stopper bolts 28.

What is claimed is:

1. A dual type hydraulic braking system for a vehicle, the system comprising, in combination; (1) a master cylinder having a pair of pressure chambers for delivering the braking pressure generated therein through two mutually independent circuits to rear and front wheel cylinders disposed on each of front and rear vehicle wheels, and (2) a control valve assembly including a pressure control valve, disposed in at least one of said circuits, said pressure control valve having:
 (i) a first piston mounted therein for controlling the braking pressure of at least one of said rear wheel cylinders so that it may be, within the sphere of exceeding a predetermined pressure, proportionate to the pressure of the master cylinder at a proportion constant less than one;
 (ii) a second piston mounted in said pressure control valve, and having a large diametered portion and a small diametered portion, said second piston positioned in such manner that an end surface of said small diametered portion thereof is to be abutted to said first piston in an air chamber, said second piston affected, at one end surface, adjacent to said small diametered portion, of said large diametered portion, by hydraulic pressure of that one of said independent circuits other than that one of said circuits in which said pressure control valve is contained, said second piston facing another air chamber at the opposite end surface of said large diametered portion; and
 (iii) a spring means constantly biasing said second piston toward said first piston,
 (iv) wherein in that among five values of (a) cross-sectional area ($S_3$) of the small diametered portion of said second piston, (b) cross-sectional area ($S_4$) of the large diametered portion of second piston, (c) the set load ($F_2$) of said spring means biasing said second piston, (d) starting pressure ($P_0$) of the pressure control operation by said first piston and (e) predetermined pressure ($P_1$) selected within a normal range higher than said starting pressure, the following inequality can be established:

$$P_1 \cdot (S_4 - S_3) > F_2 > P_0 \cdot (S_4 - S_3),$$

whereby, in case of both said circuits allowing normal pressure rising, said second piston moves in a separating direction from said first piston after said first piston has begun the pressure controlling operation.

2. A dual type hydraulic braking system as claimed in claim 1, characterized in that the aforesaid pressure control valve is disposed in a first one of said mutually independent circuits and further including a second pressure control valve positioned in the second one of said mutually independent circuits, said control valves having separate first and second pistons and being connected with one another to share said another air chamber and said spring means which bias said second piston of each pressure control valve.

3. A dual type hydraulic braking system as claimed in claim 2, characterized in that each said second piston is respectively restricted in its shifting distance by a respective stopper secured to a housing of said pressure control valves.

4. A dual type hydraulic braking system as claimed in claim 1, characterized in that said second piston is restricted in its shifting distance by a stopper secured to a housing of said pressure control valves.

5. A dual type hydraulic braking system for vehicles, the system comprising, in combination; a master cylinder having two separate pressure chambers respectively associated with a first braking circuit and a second braking circuit, rear wheel cylinders and front wheel cylinders at respective front and rear vehicle wheels of a vehicle, and a pressure control valve assembly including a pressure control valve arranged between said master cylinder and at least one of said rear wheel cylinders in at least one of said braking circuits, said pressure control valve including a first piston for controlling braking pressure of said at least one rear wheel cylinder from a predetermined pressure of said master cylinder and including a second piston having a small diametered portion, a large diametered portion and a pressure receiving surface at an end surface thereof adjacent to said small diametered portion and which is coupled to and is affected by braking pressure in said second braking circuit, said second piston being biased by a spring acting against said braking pressure from said second circuit, said second piston being positioned to be moved by said spring into a first position in which control displacements of said first piston are restrained by said spring, wherein said second piston is positioned to be displaced by said braking pressure in said second braking circuit into a second position in which control displacements of said first piston are not restrained by said spring, spring force of said spring being larger than the force acting on said pressure receiving surface of said second piston when said braking pressure has reached a value at which the controlling operation of said first piston starts, and wherein among the five values; of (a) cross-sectional area ($S_3$) of the small diametered portion of said second piston, (b) cross-sectional area ($S_4$) of the larger diametered portion of said second piston, (c) the set load ($F_2$) of said spring biasing said second piston, (d) starting pressure ($P_0$) of the pressure control operation by said first piston and (e) predetermined pressure ($P_1$) selected within a pressure range higher than said starting pressure, the following inequality can be established:

$$P_1 \cdot (S_4 - S_3) > F_2 > P_0 \cdot (S_4 - S_3),$$

whereby, in case of both said circuits allowing normal pressure rising, said second piston moves in separating direction from said first piston after said first piston has begun the pressure controlling operation.

6. A dual type hydraulic braking system for vehicles, said system comprising a master cylinder having a first pressure chamber and a second pressure chamber respectively associated with a first braking circuit and a second braking circuit for separately delivering pressure of a same value thereto, rear wheel cylinders and front wheel cylinders at respective front and rear vehicle wheels of a vehicle, and a pressure control valve assembly including a pressure control valve arranged between said master cylinder and at least one of said rear wheel cylinders in said first braking circuit, said pressure control valve having a first piston which is biased by a first spring acting against the pressure delivered from said first pressure chamber for controlling braking pressure of said at least one rear wheel cylinder from a predetermined pressure $P_0$ of said master cylinder and including a second piston having a small diametered portion and a large diametered portion with a pressure receiving surface at one end surface thereof adjacent to said small diametered portion, said pressure receiving surface being coupled to and affected by the pressure delivered from said second pressure chamber, said second piston being biased by a second spring acting against said pressure delivered from said second pressure chamber, said second piston being positioned to be moved by said second spring into a first position in which control displacements of said first piston are restrained by said second spring, said second piston being positioned to be displaced by said pressure delivered from said second pressure chamber into a second position in which control displacements of said first piston are not restrained by said second spring, spring force of said second spring being determined so that, in case of both said circuits allowing normal pressure rising, said second piston moves from said first position to said second position after said first piston has begun the pressure controlling operation resisting the spring forces of said first spring and said second spring.

7. A dual type hydraulic braking system as claimed in claim 6, characterized in that said second piston is restricted in its shifting distance by a stopper secured to a housing of said pressure control valves.

8. A dual type hydraulic braking system for vehicles, said system comprising a master cylinder having a first pressure chamber and a second pressure chamber respectively associated with a first independent braking circuit and a second independent braking circuit for separately delivering pressure of a same value thereto, rear wheel cylinders at respective front and rear vehicle wheels of a vehicle, and a pressure control valve assembly including a pressure control valve arranged between said master cylinder and at least one of said rear wheel cylinders in said first braking circuit, said pressure control valve having a first piston which is biased by a first spring acting against the pressure delivered from said first pressure chamber for controlling braking pressure of said at least one rear wheel cylinder from a predetermined pressure $P_0$ of said master cylinder and including a second piston having a small diametered portion and a large diametered portion with a pressure receiving surface at one end surface thereof adjacent to said small diametered portion, said pressure receiving surface being coupled to and affected by the pressure delivered from said second pressure chamber, said second piston being biased by a second spring acting against said pressure delivered from said second pressure chamber, said second piston being positioned to be moved by said second spring into a first position in which control displacements of said first piston are restrained by said second spring, said second piston being positioned to be displaced by said pressure delivered from said second pressure chamber into a second position in which control displacements of said first piston are not restrained by said second spring, spring force of said second spring being larger than the pressure force acting on said second piston when the pressure in said master cylinder has reached the value $P_0$ and smaller than the pressure force acting on said second piston when the the pressure in said master cylinder has reached a value $P_2$ which is higher than said value $P_0$ and lower than the maximum value expected to be possibly generated in said master cylinder, sum of spring forces of said first spring and said second spring being smaller than sum of pressure forces acting on said first piston and said second piston when the pressure in said master cylinder has reached a value $P_1$ which is larger than said value $P_0$ and smaller than said value $P_2$, whereby, in case of both said circuits allowing normal pressure rising, said second piston moves from said first position to said second position after said first piston has begun the pressure controlling operation.

9. A dual type hydraulic braking system as claimed in claim 8, including an air chamber, and wherein the aforesaid valve is disposed in a first one of said independent circuits and further including a second pressure control valve positioned in the second one of said independent circuits, said control valves having separate first and second pistons and being coupled with one another to share said air chamber and said second spring which bias said second piston of each pressure control valve.

10. A dual type hydraulic braking system as claimed in claim 8, characterized in that each said second piston is respectively restricted in its shifting distance by a respective stopper secured to a housing of said pressure control valves.

* * * * *